(12) United States Patent
Takahashi et al.

(10) Patent No.: US 12,451,233 B2
(45) Date of Patent: Oct. 21, 2025

(54) INFORMATION PRESENTATION DEVICE, INFORMATION ACQUISITION DEVICE, INFORMATION PRESENTATION METHOD, INFORMATION ACQUISITION METHOD AND INFORMATION PRESENTATION PROGRAM

(71) Applicant: NTT, Inc., Tokyo (JP)

(72) Inventors: Masami Takahashi, Tokyo (JP); Masahiro Kojima, Tokyo (JP); Takeshi Kurashima, Tokyo (JP); Hiroyuki Toda, Tokyo (JP); Tatsushi Matsubayashi, Tokyo (JP)

(73) Assignee: NTT, Inc., Tokyo (JP)

( * ) Notice: Subject to any disclaimer, the term of this patent is extended or adjusted under 35 U.S.C. 154(b) by 194 days.

(21) Appl. No.: 17/640,796

(22) PCT Filed: Jan. 17, 2020

(86) PCT No.: PCT/JP2020/001573
§ 371 (c)(1),
(2) Date: Mar. 4, 2022

(87) PCT Pub. No.: WO2021/044645
PCT Pub. Date: Mar. 11, 2021

(65) Prior Publication Data
US 2022/0336082 A1    Oct. 20, 2022

(30) Foreign Application Priority Data
Sep. 5, 2019    (WO) .................. PCT/JP2019/035006

(51) Int. Cl.
*G16H 20/70*    (2018.01)
*G16H 20/30*    (2018.01)
*G16H 20/60*    (2018.01)

(52) U.S. Cl.
CPC .............. *G16H 20/70* (2018.01); *G16H 20/30* (2018.01); *G16H 20/60* (2018.01)

(58) Field of Classification Search
CPC ......... G16H 20/30; G16H 20/60; G16H 20/70
(Continued)

(56) References Cited

U.S. PATENT DOCUMENTS

| 2014/0129942 A1* | 5/2014 | Rathod | H04N 21/44226 715/720 |
| 2015/0067845 A1* | 3/2015 | Chari | G06F 21/50 726/23 |
| 2016/0063192 A1* | 3/2016 | Johnson | G16H 40/20 705/2 |

FOREIGN PATENT DOCUMENTS

| JP | 2005011329 A | 1/2005 |
| JP | 2016206699 A | 12/2016 |

(Continued)

OTHER PUBLICATIONS

Burke et al. (2011) "Self-monitoring in weight loss: a systematic review of the literature." Journal of the American Dietetic Association 111.1, pp. 92-102.

(Continued)

*Primary Examiner* — Hiep V Nguyen

(57) ABSTRACT

An action-sequence generation unit of an information presentation device generates, based on an action log representing a target action of a user and an action history of the user, an action sequence representing a sequence of actions including the target action. A permission-level calculation unit calculates, based on the action log and a permission log, about the actions, a permission level representing a difference between a time period when the actions included in the action log were performed and a time period when the actions included in the permission log are permitted. An action specifying unit specifies, based on the action (Continued)

sequence and the permission level, out of the actions in the action sequence, an action, the permission level of which is equal to or larger than a threshold concerning the permission level, as a trigger action among the actions included in the action sequence.

9 Claims, 12 Drawing Sheets

(58) Field of Classification Search
USPC .............................................................. 705/2
See application file for complete search history.

(56) References Cited

FOREIGN PATENT DOCUMENTS

| JP | 2017091023 A | 5/2017 | | |
|---|---|---|---|---|
| WO | WO-2013123416 A2 * | 8/2013 | ........... | A61B 5/4866 |
| WO | WO-2017035404 A1 * | 3/2017 | ............. | G16H 10/60 |

OTHER PUBLICATIONS

Google "Set and manage a Reminder with Google Home" [online] website: https://support.google.com/googlenest/answer/7387866?co=GENIE.Platform%3DAndroid&hl=ja.
Apple "Apple Watch—Close Your Rings" [online] website: https://www.apple.com/jp/watch/close-your-rings.
Srikant et al. (1996) "Mining sequential patterns: Generalizations and performance improvements." International Conference on Extending Database Technology, Springer, Berlin, Heidelberg.
Pei et al. (2001) "Prexspan: Mining sequential patterns efficiently by prex-projected pattern growth." Proceedings 17th International conference on data engineering. IEEE.
Zaki, Mohammed J. (2001) "SPADE: An efficient algorithm for mining frequent sequences." Machine learning 42.1-2, pp. 31-60.
Ayres et al. (2002) "Sequential pattern mining using a bitmap representation" Proceedings of the eighth ACM SIGKDD International conference on Knowledge discovery and data mining. ACM.
Takahashi et al. (2019) "Analyzing Effects of Self-Monitoring in Daily Life", The Institute of Electronics, IEICE Technical Report, Life Intelligence and Office Information Systems Society (LOIS) vol. 119 No. 205 LOIS2019-17, pp. 91-96.
Application screen for presentations to the IEICE.

* cited by examiner

Fig. 4

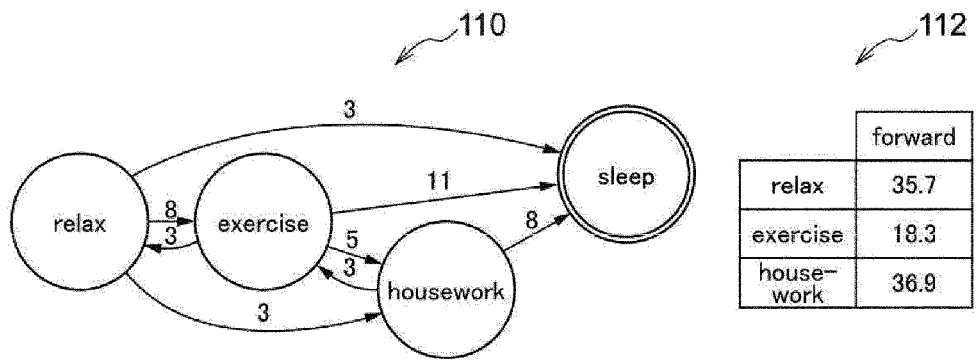

| ACTION 1 | ACTION 2 | TARGET ACTION | NUMBER OF TIMES OF APPEARANCE |
|---|---|---|---|
| relax | exercise | sleep | 8 |
| relax | housework | sleep | 3 |
| exercise | relax | sleep | 3 |
| exercise | housework | sleep | 5 |
| housework | exercise | sleep | 3 |

|  | forward |
|---|---|
| relax | 35.7 |
| exercise | 18.3 |
| housework | 36.9 |

|  | forward | backward |
|---|---|---|
| dinner | 7.3 | 23.0 |
| bath | 17.0 | 29.6 |
| shopping | 29.1 | 31.3 |
| go to work | 3.7 | 0.0 |
| breakfast | 25.6 | 18.6 |
| lunch | 1.8 | 21.6 |
| go home | 3.9 | 13.2 |
| sleep | 31.0 | 14.8 |
| relax | 35.7 | 54.5 |
| exercise | 18.3 | 32.6 |
| housework | 36.9 | 43.4 |
| snack | 54.1 | 73.9 |
| work | 4.4 | 7.2 |

Fig. 5

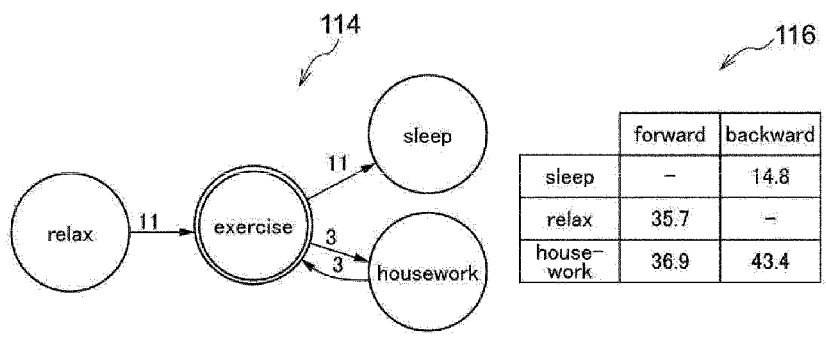

|  | forward | backward |
|---|---|---|
| sleep | – | 14.8 |
| relax | 35.7 | – |
| housework | 36.9 | 43.4 |

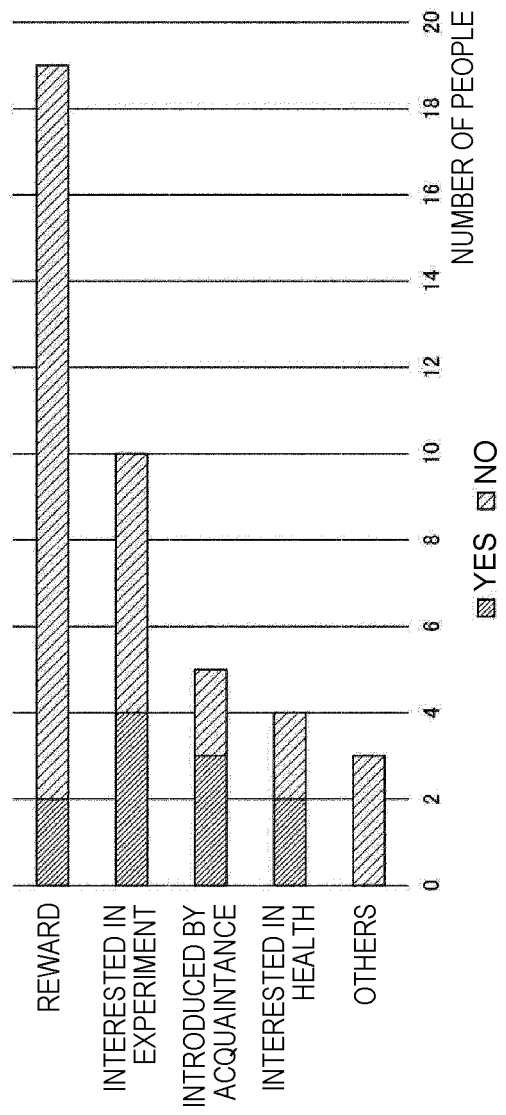

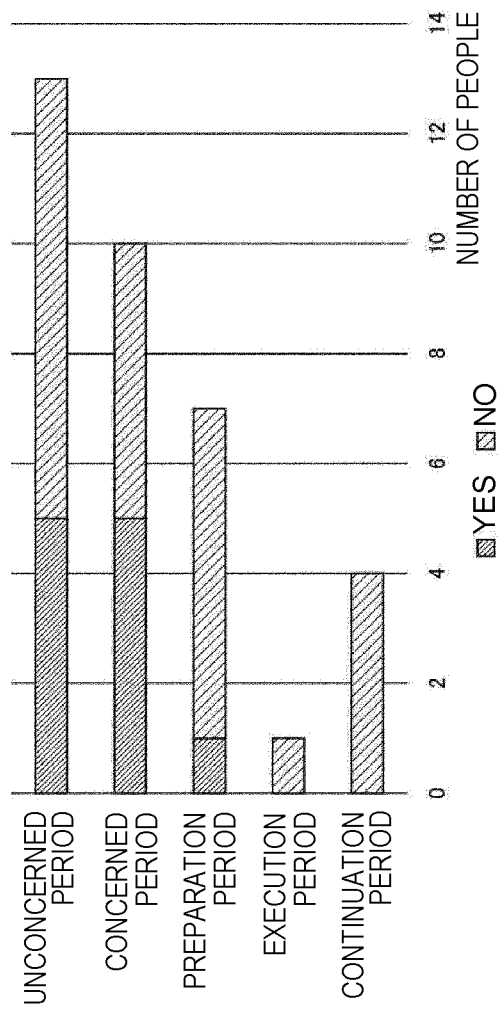

INFORMATION PRESENTATION DEVICE, INFORMATION ACQUISITION DEVICE, INFORMATION PRESENTATION METHOD, INFORMATION ACQUISITION METHOD AND INFORMATION PRESENTATION PROGRAM

CROSS-REFERENCE TO RELATED APPLICATIONS

This application is a U.S. National Stage Application filed under 35 U.S.C. § 371 claiming priority to International Patent Application No. PCT/JP2020/001573, filed on 17 Jan. 2020, which application claims priority to and the benefit of International Application No. PCT/JP2019/035006, filed on 5 Sep. 2019, the disclosures of which are hereby incorporated herein by reference in their entireties.

TECHNICAL FIELD

The disclosed technique relates to an information presentation device, an information acquisition device, an information presentation method, an information acquisition method, and a program.

BACKGROUND ART

Non-Patent Literature 1 states that recording actions, for example, diet has a weight reducing effect.

CITATION LIST

Non-Patent Literature

Non-Patent Literature 1: Burke, Lora E., Jing Wang, and Mary Ann Sevick. "Self-monitoring in weight loss: a systematic review of the literature." Journal of the American Dietetic Association 111.1 (2011): 92-102.

SUMMARY OF THE INVENTION

Technical Problem

When only actions are simply recorded as explained above, many users are satisfied by only recording the actions. There is a problem in that the recording actions does not always lead to improvement of lifestyle habits.

The disclosed technique has been devised in view of the point described above and an object of the disclosed technique is to support action improvement of a user by urging introspection of the user.

Means for Solving the Problem

A first aspect of the present disclosure is an information presentation device, the information presentation device including: an action-sequence generation unit that generates, based on an action log representing a target action of a user and an action history of the user, an action sequence representing a sequence of actions including the target action; a permission-level calculation unit that calculates, based on the action log and a permission log representing information in which actions at hours included in the action log and time periods when the actions at the hours are permitted are associated, about the actions, a permission level representing a difference between a time period when the actions included in the action log were performed and a time period when the actions included in the permission log are permitted; an action specifying unit that specifies, based on the action sequence generated by the action-sequence generation unit and the permission level calculated by the permission-level calculation unit, out of the actions in the action sequence, an action, the permission level of which is equal to or larger than a threshold concerning the permission level, as a trigger action among the actions included in the action sequence; and an information output unit that outputs the trigger action specified by the action specifying unit.

A second aspect of the present disclosure is an information presentation method, the information presentation method including a computer executing processing for: generating, based on an action log representing a target action of a user and an action history of the user, an action sequence representing a sequence of actions including the target action; calculating, based on the action log and a permission log representing information in which actions at hours included in the action log and time periods when the actions at the hours are permitted are associated, about the actions, a permission level representing a difference between a time period when the actions included in the action log were performed and a time period when the actions included in the permission log are permitted; specifying, based on the generated action sequence and the calculated permission level, out of the actions in the action sequence, an action, the permission level of which is equal to or larger than a threshold concerning the permission level, as a trigger action among the actions included in the action sequence; and outputting the specified trigger action.

A third aspect of the present disclosure is an information presentation program, the information presentation program causing a computer to execute processing for: generating, based on an action log representing a target action of a user and an action history of the user, an action sequence representing a sequence of actions including the target action; calculating, based on the action log and a permission log representing information in which actions at hours included in the action log and time periods when the actions at the hours are permitted are associated, about the actions, a permission level representing a difference between a time period when the actions included in the action log were performed and a time period when the actions included in the permission log are permitted; specifying, based on the generated action sequence and the calculated permission level, out of the actions in the action sequence, an action, the permission level of which is equal to or larger than a threshold concerning the permission level, as a trigger action among the actions included in the action sequence; and outputting the specified trigger action.

A fourth aspect of the present disclosure is an information acquisition device including: a log acquisition unit that acquires an action log representing an action history of a user and a permission log representing information in which a target action of the user or actions included in the action log and time periods when the actions are permitted are associated; and a permission-level calculation unit that calculates, based on the action log and the permission log acquired by the log acquisition unit, about the actions, a permission level representing a difference between a time period of the target action or the actions included in the action log and a time period when the actions included in the permission log are permitted.

A fifth aspect of the present disclosure is an information acquisition device including a permission-log-acquisition promotion unit that acquires an action log representing a target action of a user or an action history of the user and outputs information for creating a permission log representing information in which the target action or actions included in the action log and time periods when the actions are permitted are associated, the information prompting an input of a time period when the actions are permitted.

A sixth aspect of the present disclosure is an information acquisition method including a computer executing processing for: acquiring an action log representing an action history of a user and a permission log representing information in which a target action of the user or actions included in the action log and time periods when the actions are permitted are associated; and calculating, based on the acquired action log and the acquired permission log, about the actions, a permission level representing a difference between a time period of the target action or the actions included in the action log and a time period when the actions included in the permission log are permitted.

A seventh aspect of the present disclosure is an information acquisition method including a computer executing processing for acquiring an action log representing a target action of a user or an action history of the user and outputting information for creating a permission log representing information in which the target action or actions included in the action log and time periods when the actions are permitted are associated, the information prompting an input of a time period when the actions are permitted.

Effects of the Invention

According to the disclosed technique, it is possible to urge introspection of the user and support action improvement of the user.

BRIEF DESCRIPTION OF DRAWINGS

FIG. 4 is a diagram showing an example of an action sequence and a permission level.

FIG. 5 is a diagram showing an example of an action sequence and a permission level.

FIG. 16 is a diagram for explaining an experiment result.
FIG. 17 is a diagram for explaining an experiment result.

DESCRIPTION OF EMBODIMENTS

Figure 1:
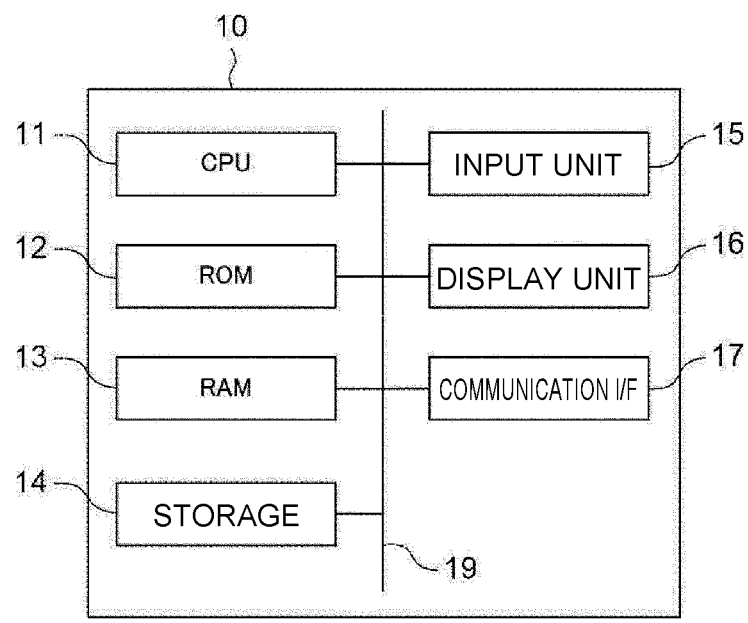
FIG. 1 is a block diagram showing a hardware configuration of an information presentation device 10 in a first embodiment.

An example of embodiments of the disclosed technique is explained below with reference to the drawings. Note that, in the drawings, the same reference numerals and signs are given to the same or equivalent components and portions. Dimension ratios of the drawings are exaggerated for convenience of explanation and are sometimes different from actual ratios.

FIG. 1 is a block diagram showing a hardware configuration of an information presentation device 10 in a first embodiment.

As shown in FIG. 1, an information presentation device 10 in the first embodiment includes a CPU (Central Processing Unit) 11, a ROM (Read Only Memory) 12, a RAM (Random Access Memory) 13, a storage 14, an input unit 15, a display unit 16, and a communication interface (I/F) 17. The components are communicably connected to one another via a bus 19.

The CPU 11 is a central processing unit and executes various programs and controls the units. That is, the CPU 11 reads out a program from the ROM 12 or the storage 14 and executes the program using the RAM 13 as a work area. The CPU 11 performs control of the components described above and various kinds of arithmetic processing according to programs stored in the ROM 12 or the storage 14. In this embodiment, various programs for processing information input by an input device are stored in the ROM 12 or the storage 14.

The ROM 12 stores various programs and various data. The RAM 13 functions as a work area and temporarily stores programs or data. The storage 14 is configured by a HDD (Hard Disk Drive), an SSD (Solid State Drive), or the like and stores various programs including an operating system and various data.

The input unit 15 includes a pointing device such as a mouse and a keyboard and is used to perform various inputs.

The display unit 16 is, for example, a liquid crystal display and displays various kinds of information. The display unit 16 may adopt a touch panel scheme and function as the input unit 15.

The communication I/F 17 is an interface for communicating with other devices such as an input device. A standard such as Ethernet (registered trademark), FDDI, or Wi-Fi (registered trademark) is used for the communication I/F 17.

Figure 2:
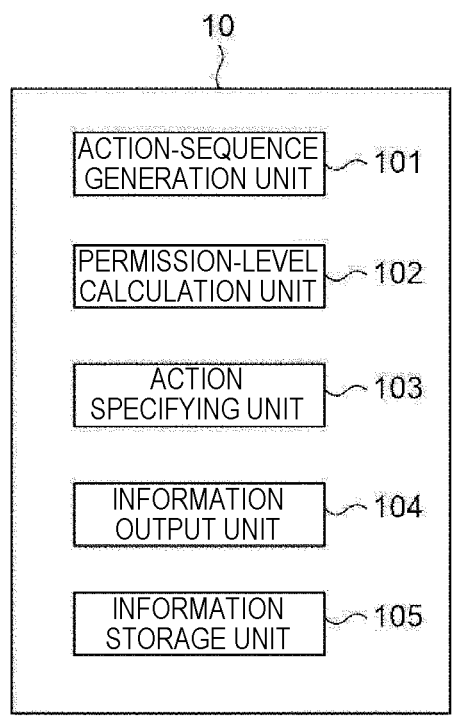
FIG. 2 is a block diagram showing an example of a functional configuration of the information presentation device 10 in the first embodiment.

Subsequently, a functional configuration of the information presentation device 10 is explained. FIG. 2 is a block diagram showing an example of the functional configuration of the information presentation device 10.

As shown in FIG. 2, the information presentation device 10 includes, as functional components, an action-sequence generation unit 101, a permission-level calculation unit 102, an action specifying unit 103, an information output unit 104, and an information storage unit 105. The functional components are realized by the CPU 11 reading out an information presentation program stored in the ROM 12 or the storage 14, developing the information presentation program in the RAM 13, and executing the information presentation program.

An increase of lifestyle-related diseases is a social problem. It is known effective to take healthy actions, for example, adjust life rhythm in order to prevent the lifestyle-related diseases.

In the healthcare field, an approach to appropriately intervening to make a user change his or her daily actions and urging healthy actions is used. For example, as a system spreading to the public, there is known a system for setting a reminder at a fixed time in advance in order to sufficiently secure a sleeping time and notifying the user using means such as a smartphone or a wearable device (see, for example, reference documents 1 and 2).

Reference document 1: Google, "Set and manage a Reminder with Google Home", https://support.google.com/googlenest/answee/ 7387866?co=G ENIE.Platform%3DAndroid&hl=ja Reference document 2: Apple, "Apple Watch—Close Your Rings", https://www.apple.com/jp/watch/close-your-rings However, it is not considered appropriate to focus on only a target action des red to be changed among actions of the user and intervene in the user. For example, even If the user sets bedtime in advance and sets a remainder, it is difficult for the user to sleep if the user has not finished what should be done before sleeping.

In order for the user to sleep at predetermined time, considering not only the target action of the user desired to be changed but also a pattern of daily actions of the user, it is important to consider what kind of actions the user performs and when the user performs the actions to be able to reasonably achieve an objective.

There are actions that can be easily changed and actions that cannot be easily changed for the user in everyday life. For example, time when the user takes breakfast is sometimes determined according to schedules of family members. Leaving work on time is sometimes obligated as a policy of a company. In such a case, it is considered there is no room for performing an action at the user's own discretion concerning breakfast or leaving work.

In this case, even if the user is urged to change a breakfast time and a work leaving time, it is difficult for the user to follow the urging. Accordingly, it is important to intervene in the user considering whether there is room to change an action for the user and to which degree the action can be changed.

Therefore, there has been a problem in that a triggering action for enabling the user to take a target action cannot be appropriately presented.

Therefore, the information presentation device 10 in the first embodiment according to the disclosed technique has been devised in view of the above point and an object of the information presentation device 10 is to appropriately present a triggering action for enabling the user to take the target action. The information presentation device 10 is specifically explained below.

The action-sequence generation unit 101 generates, based on an action log representing a target action of the user and an action history of the user, an action sequence representing a sequence of actions including the target action.

Specifically, first, the action-sequence generation unit 101 acquires the target action of the user. The target action of the user is input from, for example, the input unit 15. The target action of the user indicates an action that is a target desired to be achieved by changing an action of the user. Note that information representing the target action is preferably information including at least one of a label indicating an action, a value of activity information such as an exercise amount or the number of steps, a measurable numerical value such as a numerical value or a consumed calorie or weight, and a value concerning time such as date and time.

Figure 3:
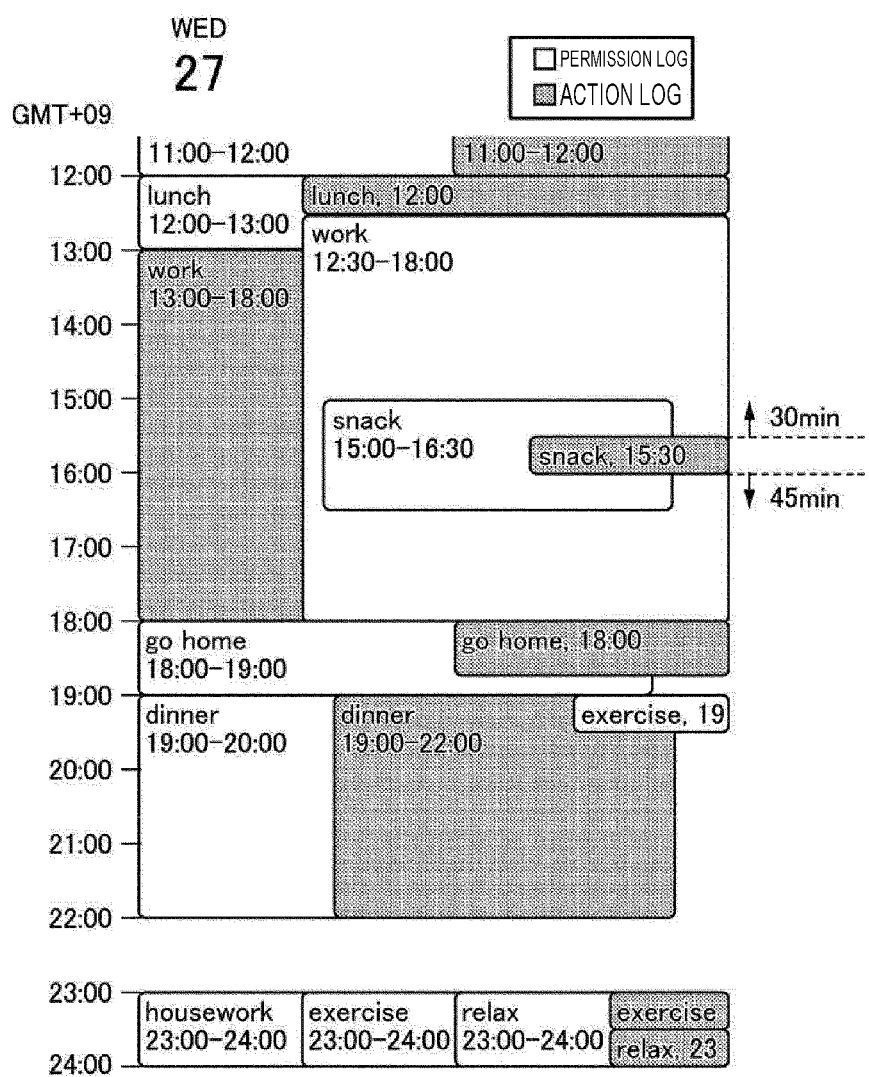
FIG. 3 is an explanatory diagram for explaining an action log and a permission log in the first embodiment.

The action-sequence generation unit 101 acquires an action log representing an action history of the user. The action log is input from, for example, the input unit 15. For example, the action-sequence generation unit 101 acquires an action log acquired by a sensor or the like from an application of a smartphone or some external device such as a wearable device. The action-sequence generation unit 101 can also acquire an action of the user as a life log in a form of a text or the like. The action-sequence generation unit 101 can also acquire the action log from a schedule table of the user. An explanatory diagram for explaining the action log is shown in FIG. 3. The action-sequence generation unit 101 can also acquire the action log from a schedule table shown in FIG. 3. Note that the action log is preferably information including an action history including a target action or an action history having a correspondence relation, for example, having a correlation with the target action.

As a method of acquiring the action log, the action log can be observed and acquired by an existing technique. Therefore, the method of acquiring the action log is not particularly limited and can be realized in various forms.

In this embodiment, a case in which the action log is represented by a set of three, that is, an action, start time of the action, and end time of the action is explained as an example. Note that, as shown in FIG. 3, it is also possible to acquire the action log from input information of a calendar as indicated by the action log.

The action-sequence generation unit 101 generates, based on the target action and the action log of the user, an action sequence representing a sequence of actions including the target action.

Examples of a method of generating the action sequence include GSP, PrexSpan, SPADE, and SPAM (see, for example, reference documents 1 to 4 below), which are methods for extracting an sequence pattern.

Reference document 1: Srikant, Ramakrishnan, and Rakesh Agrawal. "Mining sequential patterns: Generalizations and performance improvements." International Conference on Extending Database Technology. Springer, Berlin, Heidelberg, 1996.

Reference document 2: Pei, Jian, et al. "Prexspan: Mining sequential patterns efficiently by prex-projected pattern growth." Proceedings 17th international conference on data engineering. IEEE, 2001.

Reference document 3: Zaki, Mohammed J. "SPADE: An efficient algorithm for mining frequent sequences." Machine learning 42.1-2 (2001): 31-60.

Reference document 4: Ayres, Jay, et al. "Sequential pattern mining using a bitmap representation." Proceedings of the eighth ACM SIGKDD international conference on Knowledge discovery and datamining. ACM, 2002.

The methods described in the reference documents 1 to 4 is a method of retaining an order relation among actions and extracting a sequence pattern. For example, when "sleep" is a target action, action sequences of "relax-housework-sleep" and "exercise-relax-sleep" and appearance frequencies of the action sequences are output from the action log. In this case, "sleep" is the target action and "relax", "housework", and "exercise" are actions included in the action log.

Note that, as a method of generating an action sequence, besides, there is, for example, a method of considering, for example, an interval of occurrence times and giving the interval as a restriction and generating an action sequence. There is, for example, a method of regarding an action sequence as a graph structure and extracting a multi-frequency graph. Therefore, the action-sequence generation unit 101 can generate an action sequence in various forms according to relationship among actions desired to be defined.

Examples of generation of action sequences from the target action and the action log are shown in FIG. 4 and FIG. 5.

An action sequence 110 shown in FIG. 4 is generated as a sequence of "relax" representing relax, "exercise" representing exercise, "housework" representing housework, and "sleep" representing sleep. Note that numbers given on arrows in the figure represent frequencies of occurrence of order of the actions. For example, order of "exercise"→"sleep" is represented as appearing eleven times in the action log. Note that the target action in the action sequence 110 is "sleep". The action sequence 110 in FIG. 4 is generated based on, for example, a table 111 in which actions in FIG. 4 are collected. In the table 111 in which the actions are collected, a part of information used in generating the action sequence 110 is described. For example, the table 111 indicates that transition from an action 1 "relax" to an action 2 "exercise" appeared at a frequency of eight times. The action sequence 110 is generated according to such a table 111.

An action sequence 114 shown in FIG. 5 is generated as a sequence of "relax", "exercise", "housework", and "sleep". Note that the target action in the action sequence 114 is "exercise".

The action sequence 110 in FIG. 4 is an action sequence in the case in which the following (1) is set as the target action. The action sequence 114 shown in FIG. 5 is an action sequence in the case in which the following (2) is set as the target action.

(1) A target action representing "sleep at 23:00" such that sufficient sleep can be secured for health.
(2) A target action representing "exercise for 30 minutes or more" because of lack of exercise.

Note that information representing the target action, information representing the action log, and information such as the action sequence generated by the action-sequence generation unit 101 are stored in the information storage unit 105.

The permission-level calculation unit 102 calculates, based on the action log and a permission log, about actions, a permission level representing a difference between a time period when actions included in the action log were performed and a time period when actions included in the permission log are permitted. Note that the permission log represents information in which actions at hours included in the action log and a time period when the actions at the hours are permitted are associated.

Specifically, first, the permission-level calculation unit 102 acquires the action log and the permission log and extracts actions having a correspondence relation.

FIG. 3 is an example in which the action log and the permission log are input in a calendar format. As shown in FIG. 3, for example, assume that the user actually took "snack" representing a snack in a period of 15:30 to 15:45. In this case, if the user reviews the day and considers that "in a time period of 15:00 to 16:30, it might have been possible to move time for taking a snack", the user records a time period when "snack" representing a snack is permissible as "15:00 to 16:30". Therefore, a time period when an action of "snack" representing a snack is permitted is "15:00 to 16:30" and is recorded as the permission log.

When the user considers that even an action (for example, exercise) not performed in a target day "could have been performed in a time period of 19:00 to 19:30", the user records a time period when "exercise" representing exercise is permissible as "19:00 to 19:30". Therefore, a time period when the action of "exercise" representing exercise is permissible is "19:00 to 19:30" and recorded as the permission log.

Note that the permission log is preferably any one of estimation values estimated by a predetermined estimation method from data input by the user, data automatically observed through some device, and the action log.

Therefore, first, the permission-level calculation unit 102 extracts, about the actions, from the action log, a time period when the user actually performed the actions. The permission-level calculation unit 102 calculates, about the actions, a permission level representing a difference between a time period when the actions included in the action log were performed and a time period when the actions included in the permission log are permitted. The permission level is an indicator indicating to which degree a change of the time period of the actions actually performed could have been permitted before and after the time period. The permission level is also an indicator indicating to which degree times for performing the actions could have been changed for the actions.

A plurality of permission levels 112 are shown in FIG. 4 as an example of the permission level. The plurality of permission levels 112 shown in FIG. 4 correspond to the action sequence 110. The plurality of permission levels 112 include a permission level "35.7" for the action "relax", a permission level "18.3" for the action "exercise", and a permission level "36.9" for the action "housework". Note that "forward" indicates that these actions could have been changed to an earlier time period. Note that a unit of the permission value is minute. The plurality of permission levels 112 are a part of permission levels excerpted out of a plurality of permission levels 113 shown in FIG. 4. The plurality of permission levels 113 are permission levels in an example in which the action log and the permission log shown in FIG. 3 are input and a permission level of an action that can be changed to an earlier time period and a permission level of an action that can be changed to a later time period are calculated.

A plurality of permission levels 116 are shown as an example of permission levels in FIG. 5. Note that "backward" indicates that these actions could have been changed to a later time period. The plurality of permission levels 116 shown in FIG. 5 correspond to the action sequence 114. As the plurality of permission levels 116, when the action "exercise" is a target action, a permission level of an action that can be changed to an earlier time period and a permission level of an action that can be changed to a later time period are described. Specifically, the plurality of permission levels 116 include a permission level "14.8" on a "backward" side for the action "sleep", a permission level "35.7" on a "forward" side for the action "relax", and a permission level "36.9" on the "forward" side and a permission level "43.4" on the "backward" side for the action "housework". Note that a value is not written on the "forward" side of the action "sleep". This indicates that, because a frequency of appearance of the action "sleep" before the action "exercise" is small, the action "sleep" is not an action to be brought forward and backward in the first place.

In this way, the permission levels shown in FIG. 4 and FIG. 5 are calculated by the permission-level calculation unit 102.

The action specifying unit 103 specifies, based on the action sequence generated by the action-sequence generation unit 101 and the permission levels calculated by the permission-level calculation unit 102, out of the actions in the action sequence, an action, the permission level of which is equal to or larger than a threshold concerning the permission level, as a trigger action among target actions included in the action sequence.

For example, when the threshold concerning the permission level is set as thirty minutes, the action specifying unit 103 specifies an action, the permission level of which is thirty minutes, as the trigger action out of the actions in the action sequence. In the example shown in FIG. 4, the permission level of the action "relax" is "35.7" minutes and the permission level of the action "housework" is "36.9" minutes. Therefore, the action specifying unit 103 specifies these actions as trigger actions.

Alternatively, the action specifying unit 103 specifies an action, the permission level of which is the maximum, as the trigger action out of the actions in the action sequence. In this case, for example, in the example shown in FIG. 4, the permission level of the action "housework" is "36.9" minutes and is the maximum. Therefore, the action specifying unit 103 specifies the action "housework" as the trigger action.

Therefore, it is seen that, for example, in order to bring forward a sleep time in FIG. 4, a bedtime can be naturally brought forward by bringing the action "relax" or "housework" forward by approximately thirty minutes. In order to increase time for exercise, time of seventy minutes for performing the action "exercise" can be created by bringing the action "relax" forward by approximately thirty minutes and bringing the action "housework" backward by approximately forty minutes.

The action specifying unit 103 specifies the action, a frequency of which is equal to or larger than a threshold concerning the frequency, as the trigger action out of actions performed before or after the target action in the action sequence. For example, when the threshold concerning the frequency is "10", in the example shown in FIG. 4, the action specifying unit 103 specifies the action "exercise", the frequency of which is "10" or more, as the trigger action among actions performed before the target action "sleep". Alternatively, for example, when the threshold concerning the frequency is "10", in the example shown in FIG. 5, the action specifying unit 103 specifies the action "sleep", the frequency of which is "10" or more, as the trigger action among actions performed after the target action "exercise".

Alternatively, for example, in the example shown in FIG. 4, the action specifying unit 103 specifies the action "exercise", the frequency of which is the maximum "11", as the trigger action among actions performed immediately before the target action "sleep".

The trigger action specified in this way is an action to be a trigger of an action change of the user. Therefore, it is possible to change actions of the user by presenting the trigger action to the user.

The information output unit 104 outputs the trigger action specified by the action specifying unit 103 and a permission level of the trigger action.

The display unit 16 displays the trigger action and the permission level output by the information output unit 104.

The user checks the trigger action and the permission level displayed on the display unit 16 and uses the trigger action and the permission level as reference in taking the next action.

Subsequently, action of the information presentation device 10 is explained.

Figure 6:
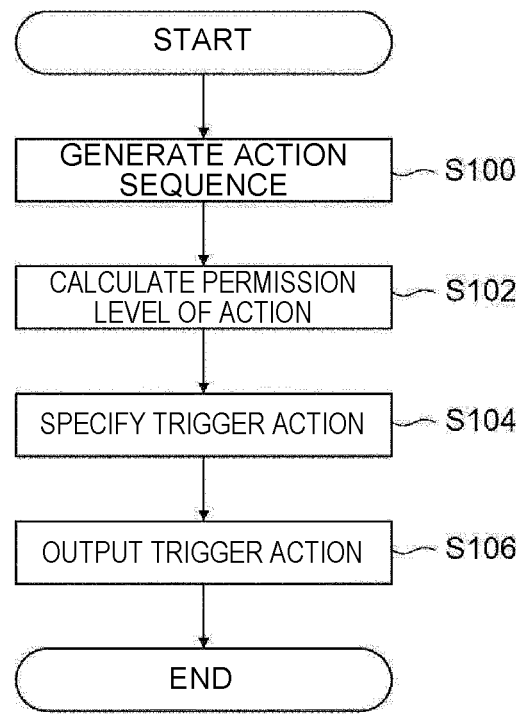
FIG. 6 is a flowchart showing a flow of information presentation processing by the information presentation device 10.

FIG. 6 is a flowchart showing a flow of information presentation processing by the information presentation device 10. The information presentation processing is performed by the CPU 11 reading out an information presentation processing program from the RCM 12 or the storage 14, developing the information presentation processing program in the RAM 13, and executing the information presentation program.

When receiving the action log, the target action, and the permission log of the user, the CPU 11 of the information presentation device 10 executes the information presentation processing shown in FIG. 6.

In step S100, the CPU 11 functions as the action-sequence generation unit 101 and generates an action sequence according to a known technique based on the target action and the action log of the user.

In step S102, the CPU 11 functions as the permission-level calculation unit 102 and calculates permission levels about actions based on the action log and the permission log.

In step S104, the CPU 11 functions as the action specifying unit 103 and specifies, based on the action sequence generated in step S100 and the permission levels of the actions calculated in step S102, the action, the permission level of which is equal to or larger than the threshold concerning the permission level, as a trigger action out of the actions in the action sequence generated in step S100.

In step S106, the CPU 11 functions as the information output unit 104, outputs the trigger action specified in step S104 and the permission level of the trigger action, and ends the information presentation processing.

The trigger action and the permission level of the trigger action output from the information output unit 104 are displayed on the display unit 16. The user takes an action corresponding to the trigger action and the permission level of the trigger action.

As explained above, the information presentation device 10 in this embodiment generates, based on the target action of the user and the action log representing the action history of the user, an action sequence representing a sequence of actions including the target action. The information presentation device 10 calculates, based on the action log and the permission log, about the actions, a permission level representing a difference between a time period when the actions included in the action log were performed and a time period when the actions included in the permission log are permitted. The permission log represents information in which the actions at hours included in the action log and the time period when the actions at the hours are permitted are associated. The information presentation device 10 specifies, based on the action sequence and the permission level, out of the actions in the action sequence, an action, the permission level of which is equal to or larger than a threshold concerning the permission level, as a trigger action among the actions included in the action sequence. The information presentation device 10 outputs the trigger action. Consequently, it is possible to appropriately present an action to be a trigger for enabling the user to take the target action.

With the information presentation device 10 in this embodiment, it is possible to appropriately specify the trigger action to be a clue for changing actions of the user. It is possible to realize more effective intervention in the user.

Subsequently, a second embodiment is explained. The second embodiment is different from the first embodiment in that, before a user carries out self-monitoring, it is estimated whether an improvement effect of lifestyle habits can be expected and, then, information concerning a permission log of the user is acquired. Note that the self-monitoring indicates that, in order to appropriately manage health or diseases of the user, the user periodically measures, records, or observes and recognizes symptoms or somatic sensation.

The self-monitoring for urging spontaneous improvement by recording actions is considered to have effects of, for example, reducing the number of times of smoking or drinking by recording and self-recognizing the number of times of smoking or drinking, other than diet.

However, this has the following two problems.
(1) At a point in time before the user starts recording of actions, it cannot be estimated which degree of an improvement effect is expected if the user starts the recording of actions.
(2) When the user simply records actions, the user is often satisfied by only recording the actions. The recording of actions does not always lead to improvement of actions.

Therefore, it has not been able to be estimated which degree of an action improvement effect can be expected at a point in time before the user starts the recording of actions.

Therefore, as information acquisition device is the second embodiment according to the disclosed technique estimates, using information acquirable before the start of the recording of actions of the user, whether an action improvement effect can be expected. The information acquisition device in the second embodiment according to the disclosed technique urges introspection of the user himself or herself and supports action improvement.

The information acquisition device is specifically explained below.

Figure 7:
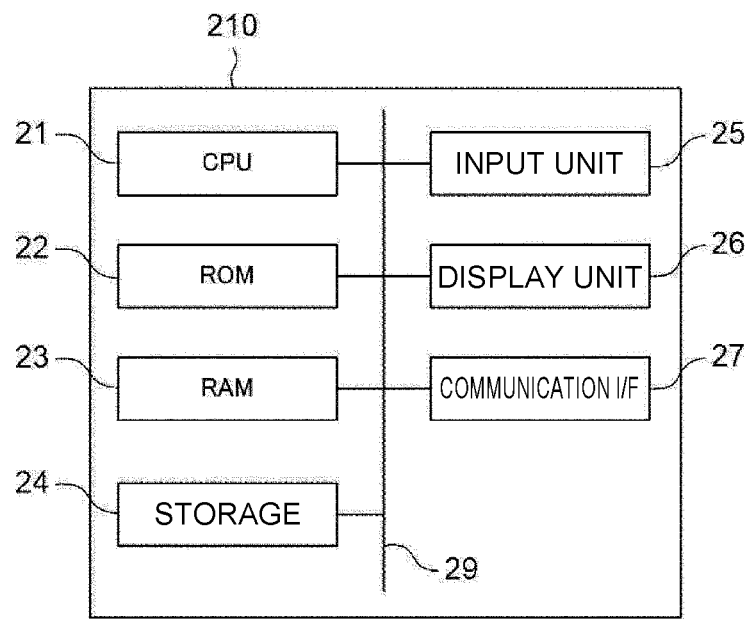
FIG. 7 is a block diagram showing a hardware configuration of an information acquisition device 210 in a second embodiment.

FIG. 7 is a block diagram showing a hardware configuration of an information acquisition device 210 in the second embodiment.

As shown in FIG. 7, the information acquisition device 210 in the second embodiment includes a CPU (Central Processing Unit) 21, a ROM (Read Only Memory) 22, a RAM (Random Access Memory) 23, a storage 24, an input unit 25, a display unit 26, and a communication interface (I/F) 27. The components are communicably connected to one another via a bus 29.

The CPU 21 is a central processing unit and executes various programs and controls the units. That is, the CPU 21 reads out a program from the ROM 22 or the storage 24 and executes the program using the RAM 23 as a work area. The CPU 21 performs control of the components described above and various kinds of arithmetic processing according to programs stored in the ROM 22 or the storage 24. In this embodiment, various programs for processing information input by an input device are stored in the ROM 22 or the storage 24.

The ROM 22 stores various programs and various data. The RAM 23 functions as a work area and temporarily stores programs or data. The storage 24 is configured by a HDD (Hard Disk Drive), an SSD (Solid State Drive), or the like and stores various programs including an operating system and various data.

The input unit 25 includes a pointing device such as a mouse and a keyboard and is used to perform various inputs.

The display unit 26 is, for example, a liquid crystal display and displays various kinds of information. The display unit 26 may adopt a touch panel scheme and function as the input unit 25.

The communication I/F 27 is an interface for communicating with other devices such as an input device. A standard such as Ethernet (registered trademark), FDDI, or Wi-Fi (registered trademark) is used for the communication I/F 27.

Figure 8:
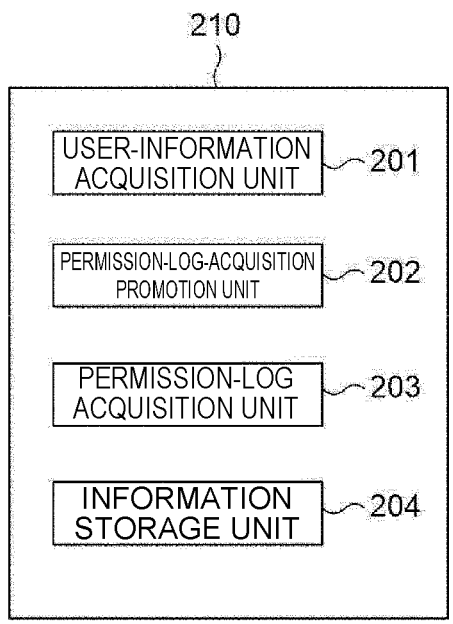
FIG. 8 is a block diagram showing an example of a functional configuration of the information acquisition device 210 in the second embodiment.

Subsequently, a functional configuration of the information acquisition device 210 is explained. FIG. 8 is a block diagram showing an example of the functional configuration of the information acquisition device 210.

As shown in FIG. 8, the information acquisition device 210 includes, as functional components, a user-information acquisition unit 201, a permission-log-acquisition promotion unit 202, a permission-log acquisition unit 203, and an information storage unit 204. The functional components are realized by the CPU 21 reading out an information acquisition program stored in the ROM 22 or the storage 24, developing the information acquisition program in the RAM 23, and executing the information acquisition program.

The user-information acquisition unit 201 acquires user information representing motivation for self-monitoring or an action stage of the user, which is an example of recording of actions of the user. Specifically, the user-information acquisition unit 201 inquires, with a prior questionnaire to the user, the user about a motivation for working on the self-monitoring or an action stage and acquires user information. Note that the user-information acquisition unit 201 may acquire attributes (sex, age, and the like) of the user as the user information besides the motivation or the action stage.

For example, the user-information acquisition unit 201 controls the display unit 26 to display the questionnaire concerning the motivation for working on the self-monitoring or the action stage. The user-information acquisition unit 201 acquires the user information input from the input unit 25. For example, in response to the questionnaire, the user answers to which of the following five stages the motivation for working on the self-monitoring or the action stage corresponds.

Unconcerned period: "Not intend to improve (lifestyle habits)"
Concerned period: "Intend to improve (lifestyle habits within approximately six months)"
Preparation period: "Intend to improve (lifestyle habits) soon (within approximately one month)"
Execution period: "Already working on improvement (of lifestyle habits) (less than six months)"
Continuation period: "Already working on improvement (of lifestyle habits) (equal to or more than six months)"

Note that, as means other than the questionnaire, the user-information acquisition unit 201 may cause the user to input necessary information through an interface of an application of the self-monitoring and acquire the user information.

The user-information acquisition unit 201 estimates, based on the acquired user information, an improvement effect of the lifestyle habits of the user by the self-monitoring. For example, when the user has a spontaneous motivation and, before the start of the self-monitoring, the motivation belongs to the unconcerned period or the concerned period among the five stages (the unconcerned period, the concerned period, the preparation period, the execution period, and the continuation period) of the action stage, the user-information acquisition unit 201 estimates that the improvement effect by the self-monitoring is high.

Therefore, when the motivation for working on the self-monitoring or the action stage of the user, which is an example of the user information, is a predetermined stage (for example, the unconcerned stage or the concerned stage), the user-information acquisition unit 201 estimates that the improvement effect by the self-monitoring is high. Note that a reason for adopting such a configuration in this embodiment is indicated by an experiment result explained below.

The permission-log-acquisition promotion unit 202 presents, to the user, according to an estimation result of the improvement effect by the self-monitoring by the user-information acquisition unit 201, information for prompting the user to input the permission log.

Specifically, when the user-information acquisition unit 201 estimates that the improvement effect by the self-monitoring is high, the permission-log-acquisition promotion unit 202 sets, according to the user information acquired by the user-information acquisition unit 201, a degree of prompting the user to input the permission log. For example, the permission-log-acquisition promotion unit 202 sets, according to the action stage, which is an example of the user information, a frequency of outputting an alert for prompting an input of the permission log.

For example, only when the action stage, which is an example of the user information, is the "unconcerned period" or the "concerned period", the permission-log-acquisition promotion unit 202 outputs the alert for prompting the user to input the permission log. The permission-log-acquisition promotion unit 202 does not output the alert when the action stage is the "preparation period", the "execution period", and the "continuation period". Note that this case is equivalent to setting a frequency of outputting the alert when the action stage is the "preparation period", the "execution period", and the "continuation period" to 0.

For example, the permission-log-acquisition promotion unit 202 sets a frequency of outputting the alert when the action stage is the "unconcerned period" or the "concerned period" to be higher than a frequency of outputting the alert when the action stage is the "preparation period", the "execution period", or the "continuation period".

For example, when the action stage is the "unconcerned period", the permission-log-acquisition promotion unit 202 increases the degree of prompting the user to input the permission log and sets the frequency of outputting the alert for prompting the user to input the permission log to be higher than when the action stage is the "concerned period".

When the action stage is the "concerned period", the permission-log-acquisition promotion unit 202 reduces the degree of prompting the user to input the permission log and sets the frequency of outputting the alert for prompting the user to input the permission log to be lower than when the action stage is the "unconcerned period". Note that a reason for setting the frequency of outputting the alert when the action stage is the "concerned period" higher than when the action stage is the "unconcerned period" is shown in FIG. 17 of the experiment result explained below.

In this way, the permission-log-acquisition promotion unit 202 outputs, according to the degree of prompting the input, the alert for prompting the input of the permission log. Specifically, the permission-log-acquisition promotion unit 202 controls the display unit 26 to display the alert for prompting the input of the permission log.

Note that, like the action-sequence generation unit 101 in the first embodiment, the permission-log-acquisition promotion unit 202 acquires the action log of the user. Therefore, for example, the permission-log-acquisition promotion unit 202 automatically presents, while being triggered by the acquisition of the action log, the alert for prompting the input of the permission log to the display unit 26.

Figure 9:
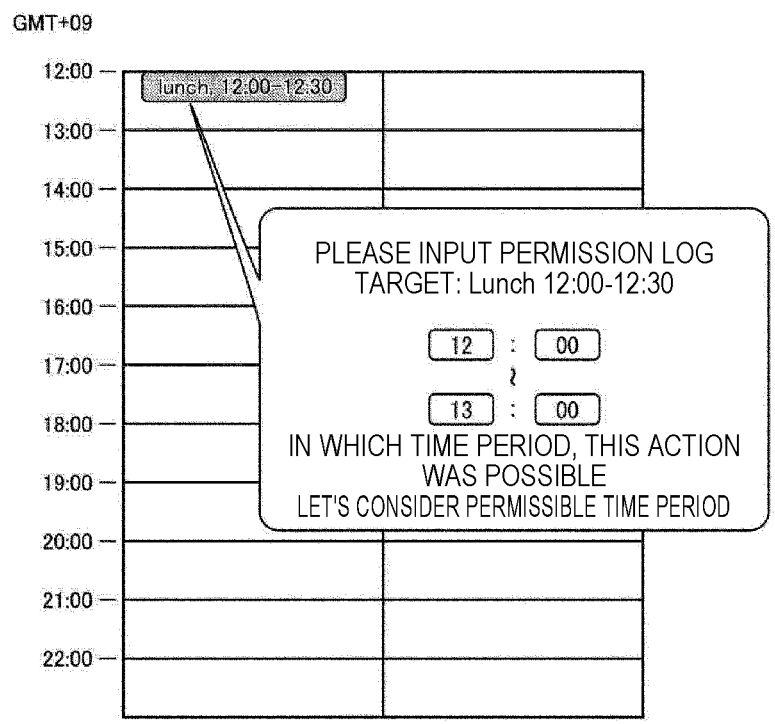
FIG. 9 is a diagram showing an example of a display screen for prompting an input of a permission log.

An example of the information for prompting the user to input the permission log is shown in FIG. 9. For example, the permission-log-acquisition promotion unit 202 causes the display unit 26 to display a screen shown in FIG. 9. FIG. 9 is an example of an information for prompting an input of a time period when actions for creating the permission log are permitted.

The permission-log acquisition unit 203 acquires the permission log input from the input unit 25. The permission-log acquisition unit 203 stores the acquired permission log in the information storage unit 204.

Data of the permission log acquired by the permission-log acquisition unit 203 is stored in the information storage unit 204. The data of the permission log stored in the information storage unit 204 is used in, for example, the information presentation device 10 in the first embodiment.

Subsequently, action of the information acquisition device 210 is explained.

Figure 10:
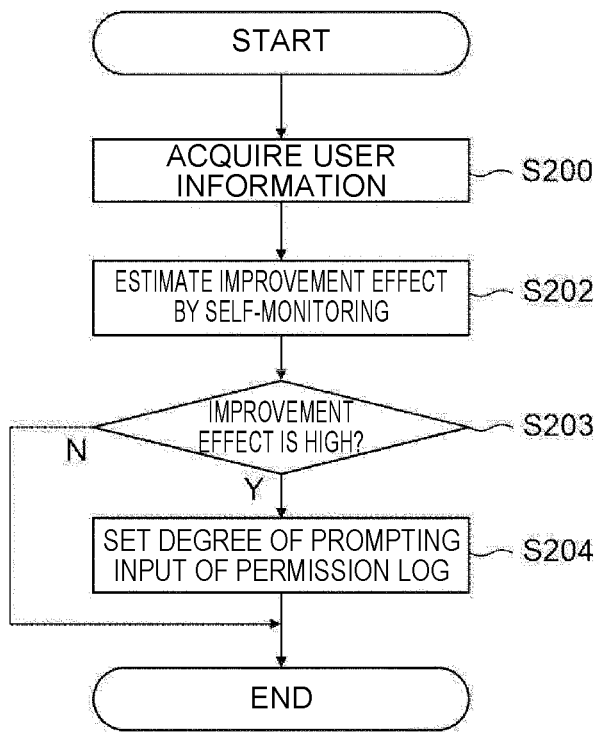
FIG. 10 is a flowchart showing a flow of information presentation processing by the information acquisition device 210.

FIG. 10 is a flowchart showing a flow of information acquisition processing by the information acquisition device 210. The information acquisition processing is performed by the CPU 21 reading out an information acquisition processing program from the ROM 22 or the storage 24, developing the information acquisition program in the RAM 23, and executing the information acquisition program.

In step S200, the user-information acquisition unit 201 controls the display unit 26 to display a questionnaire concerning a motivation for working on self-monitoring or an action stage. In step S200, the user-information acquisition unit 201 acquires user information input from the input unit 25.

In step S202, the user-information acquisition unit 201 estimates an improvement effect of lifestyle habits of the user based on the user information acquired in step S200.

In step S203, the permission-log-acquisition promotion unit 202 determines whether the improvement effect by the self-monitoring estimated in step S202 is high (for example, at a predetermined stage). When determining that the improvement effect by the self-monitoring is high, the permission-log-acquisition promotion unit 202 proceeds to step S204. On the other hand, when determining that the improvement effect by the self-monitoring is low, the permission-log-acquisition promotion unit 202 ends the information acquisition processing.

In step S204, the permission-log-acquisition promotion unit 202 sets, according to the user information acquired in step S200, a presentation frequency of an alert, which is an example of a degree of prompting the user to input the permission log, and ends the information acquisition processing.

Figure 11:
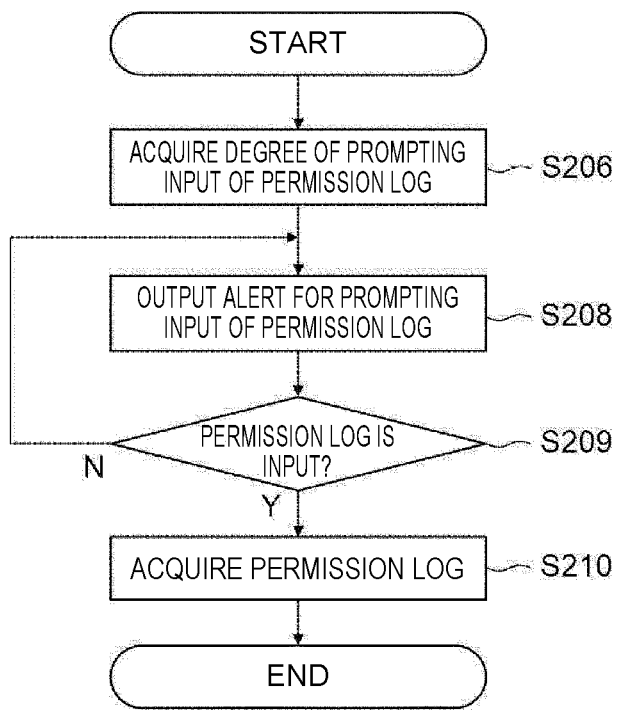
FIG. 11 is a flowchart showing a flow of information presentation processing by the information acquisition device 210.

Subsequently, information acquisition processing shown in FIG. 11 is executed. For example, when the action log is acquired by the permission-log-acquisition promotion unit 202, the information acquisition processing shown in FIG. 11 is executed.

In step S206, the permission-log-acquisition promotion unit 202 acquires the degree of prompting the input set in step S204.

In step S208, the permission-log-acquisition promotion unit 202 outputs, according to the degree of prompting the input acquired in step S206, an alert for prompting the input of the permission log.

In step S209, the permission-log acquisition unit 203 determines whether the permission log is input from the input unit 25. When the permission log is input, the permission-log acquisition unit 203 proceeds to step S210. On the other hand, when the permission log is not input, the permission-log acquisition unit 203 returns to step S208.

Note that a processing frequency of step S208 is determined according to the degree of prompting the input acquired in step S206.

In step S210, the permission-log acquisition unit 203 acquires the permission log input from the input unit 25. The permission-log acquisition unit 203 stores the acquired permission log in the information storage unit 204 and ends the information acquisition processing.

As explained above, the information acquisition device 210 in the second embodiment acquires user information representing a motivation or a stage of an action of the user for recording of actions of the user and sets, according to the user information, a degree of prompting the user to input the permission log. The information acquisition device 210 outputs, according to the degree, information for prompting the input of the permission log. Consequently, it is possible to acquire information concerning to which degree a time of an action actually taken by the user can be changed. It is possible to estimate which degree of an improvement effect can be expected at a point in time before the recording of the action by the self-monitoring is started. Further, when it is estimated that the improvement effect is high at the point in time before the recording of the action by the self-monitoring is started, it is possible to appropriately output the information for prompting the input of the permission log. Consequently, it is possible to urge introspection of the user and support action improvement of the user.

It is possible to estimate whether the improvement effect can be expected by only recording actions from a point in time before the recording of the actions of the user is started. By prompting an input of data indicating how an action can be changed, it is possible to urge self-recognition and introspection of the user and improve a spontaneous action improvement effect.

Modification 1

Figure 12:
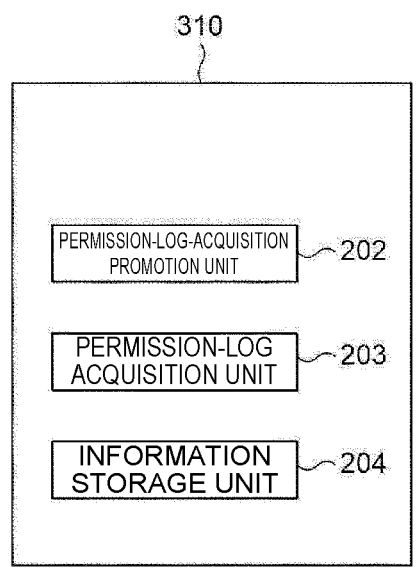
FIG. 12 is a diagram showing a modification of the second embodiment.

The information acquisition device 210 in the second embodiment may have the configuration of an information acquisition device 310 shown in FIG. 12. In this case, the permission-log-acquisition promotion unit 202 of the information acquisition device 310 acquires an action log and outputs information for prompting an input of a permission log. The permission-log-acquisition promotion unit 202 outputs, as an example of the information for prompting the input of the permission log, an alert for prompting the input of the permission log. Alternatively, the permission-log-acquisition promotion unit 202 of the information acquisition device 310 automatically presents a permission log acquisition screen as an example of the information for prompting the input of the permission log. The permission-log acquisition unit 203 of the information acquisition device 310 acquires the permission log input from the input unit 25.

Modification 2

Figure 13:
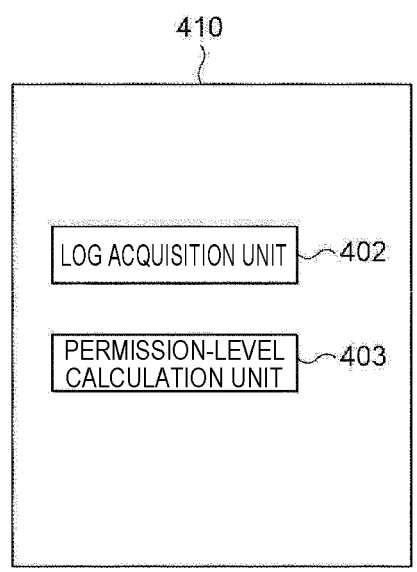
FIG. 13 is a diagram showing a modification of the second embodiment.

The embodiments may be combined to configure an information acquisition device 410 shown in FIG. 13. In this case, a log acquisition unit 402 of the information acquisition device 410 acquires an action log and a permission log. A permission-level calculation unit 403 of the information acquisition device 410 calculates, based on the action log and the permission log acquired by the log acquisition unit 402, about actions, a permission degree representing a difference between a time period when the actions included in the action log were performed and a time period when the actions included in the permission log are permitted. Note that the log acquisition unit 402 of the information acquisition device 410 has functions equivalent to the functions of the information acquisition device 210 in the second embodiment or the information acquisition device 310, which is the modification of the second embodiment.

Note that the acquisition of the information in the devices in the embodiments can include receiving information transmitted from other devices and the like. For example, an action log or a permission log acquired by a plurality of devices (for example, smartwatches or tablet devices) in cooperation being transmitted to the devices in the embodiments and the devices receiving the action log or the permission log acquired by the other devices can also be included in the acquisition of the information in the embodiments.

Experiment Result

Subsequently, an experiment performed concerning the information acquisition device 210 in the second embodiment is explained.

(Overview)

In this experiment, what kinds of changes occur in lifestyle habits and what kinds of characteristics people whose consciousness or actions change have were investigated by self-monitoring for recording and reviewing everyday actions.

(Participants)

Forty participants in 20's and over not receiving health instructions including instructions for lifestyle-related diseases from doctors were invited. In the invitation and an orientation meeting, the participants were informed that the experiment was life log data collection for the purpose of modeling natural daily actions and were informed to record usual life. This is to collect, as basic data, data about whether changes by the self-monitoring appear in a state in which the participants are not aware of improvement of lifestyle habits. In this experiment, an analysis was performed with data of thirty-five people.

(Data Collection)

There are four types of data to be collected in the experiment: a prior questionnaire for inquiring about attributes of the participants, action stages before the experiment, and the like, an action log in which everyday actions are recorded, a permission log for reviewing and recording whether actions are successfully changed, and a questionnaire for inquiring about changes of consciousness and actions concerning lifestyle habits after an investigation end.

Contents of the action log and the permission log and a method of collecting the action log and the permission log are explained. The participants were requested to manually input the action log and the permission log using a calendar application shown in FIG. 14 as a tool for performing the self-monitoring. Note that recording contents recorded using the calendar application are "type of an action", "start hour", and "end hour".

Actions set as collection targets this time are the following seventeen types: sleep, breakfast, lunch, dinner, snack, go to work, work, go home, housework, exercise, relax, bath, hobby, drinking, shopping, business trip, and leisure. A standard of granularity of time is set to approximately fifteen minutes. The recording contents and the types of the actions are the same in the action log and the permission log. In the recording, a plurality of actions may be present in one time period, for example, the participant may take a snack while working.

Figure 14:
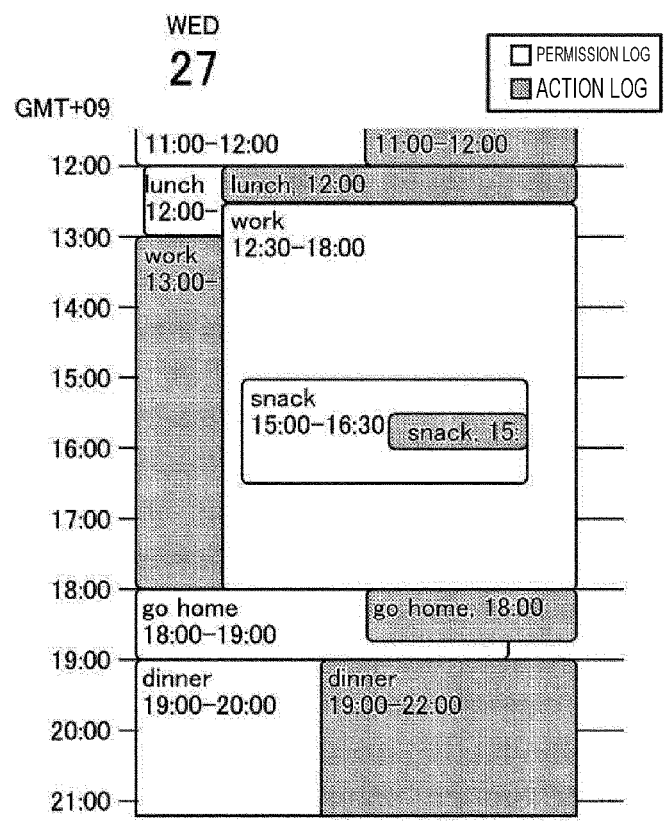
FIG. 14 is a diagram for explaining an experiment result.

The action log is relatively easily to understood because a performed action is recorded in the action log. However, the permission log is a concept that people are not usually aware. An idea of the permission log, precautions in inputting the permission log, and the like were supplementarily explained in the orientation meeting and at an initial stage of the experiment. If lunch is taken at time of 12:00 to 12:30, when the day is reviewed and it is considered that "it might have been possible to move time for taking lunch within a time width of 12:00 to 13:00", a permissible time is recorded as "12:00 to 13:00". This intends to cause the participant to be aware of, about an action performed by the participant, a range of time that the participant had discretion to change. Even an action (for example, exercise) not performed in the day is recorded as "19:00 to 19:30" if it is considered that "exercise might have been possible in a time period of 19:00 to 19:30". This intends to cause the participant to be aware where in a schedule of the participant the action can be realistically incorporated when the participant desires to change or learn some habit. This intends to, for example, as shown in FIG. 14, when the action log of lunch (in FIG. 14, described as "lunch") is 12:00 to 12:30 and the permission log of the lunch is 12:00 to 13:00, lead the participant to notice that the participant could have been taken lunch for a little longer time.

(Result and Examination)
(How Many People had Changes)

Figure 15:
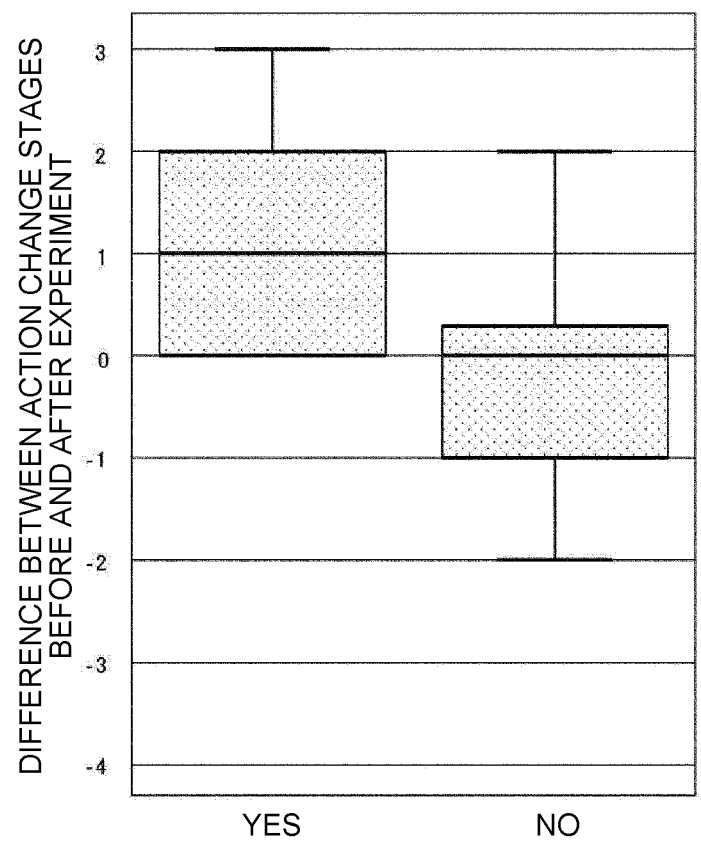
FIG. 15 is a diagram for explaining an experiment result.

The participants who answered "yes" to a question "lifestyle habits were changed by recording actions" in the questionnaire at the experiment end time are 31.4% of all the participants. This value is calculated assuming that people who answered that lifestyle habits were changed by factors other than the recording of actions did not have "changes by the recording". About to which degree an action changed, stages before and after the experiment were compared using a stage model of an action change as a scale. About the stages, values 1, 2, 3, 4, and 5 are allocated to the unconcerned period, the concerned period, the preparation period, the action period, and the continuation period in this order. A value after the experiment is subtracted from a value before the experiment to calculate a difference. A plus difference indicates that an action stage moved forward and a minus difference indicates that the action stage moved backward. The participants are classified into a group of the participants who answered that lifestyle habits were changed by the self-monitoring and a group of the participants who answered that lifestyle habits were not changed by the self-monitoring and to which degree the action stage changed (in FIG. 15, described as "a difference between action change stages before and after experiment) and a median and a range of the difference are shown as box plots (see FIG. 15).

(What Kinds of Changes in Actions and Consciousness Occurred)

In the group of the participants who answered that lifestyle habits changed, the group of the participants was asked, in a free description, in the questionnaire after the experiment end, what kinds of habits specifically changed (see Table 1 below). A plurality of opinions of one person are respectively treated as separate opinions. Examples of changed contents include sleep, snack, drinking, exercise, and meal. Changes leading to improvement of life rhythm as in No. 1 to 3 are seen. As an influence due to the recording of the permission log this time, No. 4 states that "Successfully found what should I improve" about the input of the permission log in the questionnaire after the end. The recording of the permission log led to a change of an action for bringing forward a sleep time. No. 5 states that "Recorded the permission log considering that I actually did not want to do this rather than I actually wanted to do this". By reviewing how an action could be changed, the person noticed an undesirable action and a change for reducing the action is considered to have occurred.

TABLE 1

| No. | Changed contents |
|---|---|
| 1 | Felt like living life with regularity |
| 2 | Aware of awake and sleep times |
| 3 | Increased a sleep time and slept at a determined time |
| 4 | Sleeping time changed to a little earlier time |
| 5 | Succeeded in becoming aware of and reducing a habit of taking a snack late at night |
| 6 | Re-recognized customary drinking at every night and intentionally set non-drinking days |
| 7 | By inputting actions, found that drinking was much and exercise was little and slightly regretted |
| 8 | Led to an idea of taking a longer sleeping time and taking dinner earlier |
| 9 | Wanted to take dinner for a longer time and kept this in mind |
| 10 | Slightly reduced a lazy time |
| 11 | Reduced time spent without particularly performing anything |
| 12 | Reviewed the self-monitoring like a diary and had a clue for improving life habits |
| 13 | Actually felt that I did not live healthy life surprisingly |

(Tendency for Each of Participation Reasons)

When presence or absence of a change of lifestyle habits was checked for each of reasons for experiment participation, a result shown in FIG. 16 was obtained. Note that "YES" shown in the following figures indicates that a change of lifestyle habits was present and "NO" indicates that a change of lifestyle habits was absent. As shown in FIG. 16, among nineteen participants who mentioned that the reason was a reward, the change was present in two participants (10.5%). An extrinsic motivation such as a monetary reward did not lead to a spontaneous change of actions in the task of this time. There are sixteen participants who did not mention that the reason was a reward. Nine participants (56.3%), more than half of the sixteen participants, belong to the group of the participants who answered a change was present in lifestyle habits. Therefore, it was found that, about the participants having motivations other than the reward, the self-monitoring has a certain effect in improvement of habits.

(Tendency for Each of Action Stages)

When a ratio of the participants who answered a change of lifestyle habits was present was checked for each of action stages before the experiment, the ratio was relatively high at five participants among thirteen participants (38.5%) in the unconcerned period and five participants among ten participants (50%) in the concerning period (see FIG. 17). The self-monitoring is a method recommended in the preparation period and the execution period as an intervention strategy for an action change. However, changes were seen in the participants in the unconcerned period and the concerned period, which are initial stages, in the target people of this time.

(Tendency for Each of Attributes)

A cross-tabulated attributes of the participants are shown in Table 2. As a whole, 31.4% participants answered that lifestyle habits changed. According to tabulation for each of the attributes, a ratio of the number of people having changes is higher in female participants in 40's having family living together.

TABLE 2

| Attributes | | Change | No change |
|---|---|---|---|
| Sex | Male | 7 | 18 |
| | Female | 4 | 6 |
| Age | 20-29 | 2 | 6 |
| | 30-39 | 5 | 11 |
| | 40-49 | 3 | 3 |
| | 50- | 1 | 4 |
| Family living together | Yes | 8 | 16 |
| | No | 3 | 8 |

(Summary)

In this experiment, an experiment for determining whether changes in consciousness and actions for improving lifestyle habits and adjusting life rhythm can be caused by performing the self-monitoring for recording and reviewing everyday actions was performed. The self-monitoring was requested to the thirty-five participants in two months. The following knowledge was clarified by analyzing the questionnaires before and after the experiment.

(1) A change of lifestyle habits was present in 31.4% participants and a stage of an action change was improved by one stage in average.
(2) When it was checked in what kinds of points the improvement was seen, there were a lot of opinions that the improvement was considered to be an influence of the recording of the permission log. It is likely that design of the permission log improved an effect of giving awareness.
(3) Changes in consciousness and actions occurred in a half or more participants excluding the participants who participated with an extrinsic motivation.
(4) Unlike the knowledge of the prior researches, a tendency of high effect was seen in the participants in the action stages of the unconcerned period or the concerned period.

According to the experiment result explained above, the group of users who answered "lifestyle habits was improved" has a spontaneous motivation. An improvement effect was seen when the group of users belongs to the "unconcerned period" or the "concerned period" among the five stages of the action stages (the unconcerned period, the concerned period, the preparation period, the execution period, and the continuation period) before the start of the experiment.

Therefore, it was confirmed by the experiment that it is likely that the target persons, for whom an improvement effect is expected from the motivation and the action stage, can be urged to action improvement with high accuracy by actively prompting the target persons to input the permission log. The self-monitoring is a method recommended in the preparation period and the execution period as an intervention strategy for an action change. However, more changes were seen in the participants in the unconcerned period and the concerned period, which are initial stages, (compared with the participants in the other stages) in the experiment of this time. This is surmised to be influenced by the experiment of this time that requested the input of the permission log in addition to the recording of the actions.

Therefore, the following three points were clarified by the experiment.

(1) The self-monitoring by the action log and the permission log has an effect in, for example, improvement of lifestyle habits of the user.
(2) The design of the permission log is likely to increase the effect of giving awareness to the user.
(3) The level of the effect is differentiated by the motivation or the action stage of the user.

Note that various processors other than the CPU may execute the information processing executed by the CPU reading software (the program) in the embodiments. As the processors in this case, a PLD (Programmable Logic Device), a circuit configuration of which can be changed after manufacturing, such as an FPGA (Field-Programmable Gate Array), a dedicated electric circuit, which is a processor having a circuit configuration exclusively designed to execute specific processing, such as an ASIC (Application Specific Integrated Circuit), and the like are illustrated. The information processing may be executed by one of these various kinds of processors or may be executed by a combination of two or more processors of the same type or different types (for example, a plurality of FPGAs and a combination of the CPU and the FPGA). A hardware structure of these various processors is more specifically an electric circuit obtained by combining circuit elements such as semiconductor elements.

In the embodiments, the form in which the program is stored (installed) in the storage 14 in advance is explained. However, the present disclosure is not limited to this. The program may be provided in a form in which the program is stored in non-transitory storage media such as a CD-ROM (Compact Disk Read Only Memory), a DVD-ROM (Digital Versatile Disk Read Only Memory), and a USB (Universal Serial Bus) memory. The program may be in a form in which the program is downloaded from an external device via a network.

The information processing in this embodiment may be configured by a computer, a server, or the like including a general-purpose arithmetic processing device, a storage device, and the like. Respective kinds of processing may be executed by a program. The program is stored in the storage device and can also be recorded in a recording medium such as a magnetic disk, an optical disk, or a semiconductor memory or can also be provided through a network. Naturally, any other components do not always have to be realized by a single computer or server and may be executed by being distributed to a plurality of computers connected by a network.

Note that embodiments are not limited to the embodiments explained above. Various modifications and applications are possible within a range not departing from the gist of the embodiments.

For example, in the embodiments explained above, the case in which information in which actions included in an action log and time periods in which the actions are permitted are associated is a permission log is explained as an example. However, the present disclosure is not limited to this. For example, information in which actions included in a target action of a user and time periods when the actions are permitted are associated may be the permission log. In this case, a permission log corresponding to the target action is acquired. Note that, when only the time periods of the actions for creating the permission log are input from the user, in FIG. 9, time periods when the actions included in the target action of the user are permitted are acquired. For example, when "exercise for thirty minutes a day" is set as the target action and the user skips the target action, a permission log corresponding to the target action is acquired. In this case, for example, a permission log indicating in which time period implementation of "exercise for thirty minutes a day" serving as the target action is permitted is acquired.

The following notes are further disclosed concerning the embodiments explained above.

(Note 1)

An information presentation device including: a memory; and at least one processor connected to the memory, the processor being configured to: generate, based on an action log representing a target action of a user and an action history of the user, an action sequence representing a sequence of actions including the target action; calculate, based on the action log and a permission log representing information in which actions at hours included in the action log and time periods when the actions at the hours are permitted are associated, about the actions, a permission level representing a difference between a time period when the actions included in the action log were performed and a time period when the actions included in the permission log are permitted; specify, based on the generated action sequence and the calculated permission level, out of the actions in the action sequence, an action, the permission level of which is equal to or larger than a threshold concerning the permission level, as a trigger action among the actions included in the action sequence; and output the specified trigger action.

(Note 2)

A non-transitory storage medium storing an information presentation program for causing a computer to execute processing for: generating, based on an action log representing a target action of a user and an action history of the user, an action sequence representing a sequence of actions including the target action; calculating, based on the action log and a permission log representing information in which actions at hours included in the action log and time periods when the actions at the hours are permitted are associated, about the actions, a permission level representing a difference between a time period when the actions included in the action log were performed and a time period when the actions included in the permission log are permitted; specifying, based on the generated action sequence and the calculated permission level, out of the actions in the action sequence, an action, the permission level of which is equal to or larger than a threshold concerning the permission level, as a trigger action among the actions included in the action sequence; and outputting the specified trigger action.

(Note 3)

An information acquisition device including: a memory; and at least one processor connected to the memory, the processor being configured to: acquire an action log representing an action history of a user and a permission log representing information in which a target action of the user or actions included in the action log and time periods when the actions are permitted are associated; and calculate, based on the acquired action log and the acquired permission log, about the actions, a permission level representing a difference between a time period of the target action or the actions included in the action log and a time period when the actions included in the permission log are permitted.

(Note 4)

A non-transitory storage medium storing an information acquisition program for causing a computer to execute processing for: acquiring an action log representing an action history of a user and a permission log representing information in which a target action of the user or actions included in the action log and time periods when the actions are permitted are associated; and calculating, based on the acquired action log and the acquired permission log, about the actions, a permission level representing a difference between a time period of the target action or the actions included in the action log and a time period when the actions included in the permission log are permitted.

(Note 5)

An information acquisition device including: a memory; and at least one processor connected to the memory, the processor being configured to acquire an action log representing a target action of a user or an action history of the user and output information for creating a permission log representing information in which the target action or actions included in the action log and time periods when the actions are permitted are associated, the information prompting an input of a time period when the actions are permitted.

(Note 6)

A non-transitory storage medium storing an information acquisition program for causing a computer to execute processing for acquiring an action log representing a target action of a user or an action history of the user and outputting information for creating a permission log representing information in which the target action or actions included in the action log and time periods when the actions are permitted are associated, the information prompting an input of a time period when the actions are permitted.

REFERENCE SIGNS LIST

10 Information presentation device
101 Action-sequence generation unit
102 Permission-level calculation unit
103 Action specifying unit
104 Information output unit
105 Information storage unit
201 User-information acquisition unit
202 Permission-log-acquisition promotion unit
203 Permission-log acquisition unit
204 Information storage unit
210 Information acquisition device
310 Information acquisition device
402 Log acquisition unit
403 Permission-level calculation unit
410 Information acquisition device

The invention claimed is:

1. An information presentation device comprising:
a memory; and
at least one processor coupled to the memory,
memory storing instructions that, when executed by the at least one processor, causes the system to perform a set of operations, the set of operations comprising:
generate, based on an action log representing a target action of a user and an action history of the user, an action sequence representing a sequence of actions including the target action;
generate, based on interactively received a permission log entry data through a graphical user interface, a permission log, wherein the permission log representing information in which actions have taken place included in the action log and time periods when the actions are permitted are associated, wherein the permission log is different from the action log;
calculate, based on the action log and a permission log, a permission level representing a difference between a time period when the actions included in the action log were performed and a time period when the actions included in the permission log are permitted;
specify, based on the action sequence and the permission level, out of the actions in the action sequence, an action in which the permission level of which is equal to or larger than a threshold concerning the permission level, as a trigger action among the actions included in the action sequence, wherein the trigger action represents an action that is allowed to move forward or backward such that the trigger action indicates a timing at which the trigger action should be performed such that the user achieves the target action;

display, the determined trigger action; and update the action log based on acquired action sequence.

2. The information presentation device according to claim 1, wherein the at least one processor further configured to specify an action, the permission level of which is maximum, as the trigger action out of the actions in the action sequence.

3. The information presentation device according to claim 1, wherein the at least one processor further configured to specify an action, a frequency of which is equal to or larger than a threshold concerning the frequency, as the trigger action out of the actions performed before and after the target action in the action sequence.

4. The information presentation device according to claim 1, wherein the at least one processor further configured to output the permission level of the trigger action.

5. An information acquisition device comprising:

a memory, and at least one processor coupled to the memory, memory storing instructions that, when executed by the at least one processor, causes the system to perform a set of operations, the set of operations comprising:

acquire an action log representing an action history of a user and a permission log representing information in which a target action of the user or actions included in the action log and time periods when the actions are permitted are associated;

acquire, based on interactively received a permission log entry data through a graphical user interface, a permission log representing information in which actions have taken place included in the action log and time periods when the actions are permitted are associated, wherein the permission log is different from the action log; and calculate, based on the action log and the permission log, about the actions, a permission level representing a difference between a time period of the target action or the actions included in the action log and a time period when the actions included in the permission log are permitted, determine, a trigger action among the actions included in the action sequence, wherein the trigger action represents an action that is allowed to move forward or backward such that the trigger action indicates a timing at which the trigger action should be performed such that the user achieves the target action; and update the action log based on acquired action.

6. The information acquisition device according to claim 5, the at least one processor further configured to:

acquire user information representing a motivation for recording of the actions of the user or an action stage of the user; and set, according to the user information, a degree of prompting the user to input the permission log and output, according to the degree, information for prompting the input of the permission log.

7. An information acquisition device comprising:

a memory; and at least one processor coupled to the memory, memory storing instructions that, when executed by the at least one processor, causes the system to perform a set of operations, the set of operations comprising:

acquire an action log representing a target action of a user or an action history of the user and output information for creating a permission log representing information in which the target action or actions included in the action log and time periods when the actions are permitted are associated, the information prompting an input of a time period when the actions are permitted; and acquire based on interactively received a permission log entry data through a graphical user interface a permission log representing information in which actions have taken place included in the action log and time periods when the actions are permitted are associated, wherein the permission log is different from the action log, determine, a trigger action among the actions included in the action sequence, wherein the trigger action represents an action that is allowed to move forward or backward such that the trigger action indicates a timing at which the trigger action should be performed such that the user achieves the target action; and update the action log based on acquired action.

8. A non-transitory recording medium storing an information presentation program executable by a computer to perform a set of operations, the set of operations comprising:

generating, based on an action log representing a target action of a user and an action history of the user, an action sequence representing a sequence of actions including the target action;

generating, based on interactively received a permission log entry data through a graphical user interface, a permission log, wherein the permission log representing information in which actions have taken place included in the action log and time periods when the actions are permitted are associated, wherein the permission log is different from the action log;

calculating, based on the action log and a permission log, a permission level representing a difference between a time period when the actions included in the action log were performed and a time period when the actions included in the permission log are permitted;

specifying, based on the action sequence and the permission level, out of the actions in the action sequence, an action in which the permission level of which is equal to or larger than a threshold concerning the permission level, as a trigger action among the actions included in the action sequence, wherein the trigger action represents an action that is allowed to move forward or backward such that the trigger action indicates a timing at which the trigger action should be performed such that the user achieves the target action;

displaying, the determined trigger action; and updating the action log based on acquired action sequence.

9. A non-transitory recording medium storing an information acquisition program executable by a computer to perform a set of operations, the set of operations comprising:

acquiring an action log representing a target action of a user or an action history of the user and output information for creating a permission log representing information in which the target action or actions included in the action log and time periods when the actions are permitted are associated, the information prompting an input of a time period when the actions are permitted; and acquiring based on interactively received a permission log entry data through a graphical user interface a permission log representing information in which actions have taken place included in the action log and time periods when the actions are permitted are associated, wherein the permission log is different from the action log, determining, a trigger action among the actions included in the action sequence, wherein the trigger action represents an action that is allowed to move forward or backward such that the trigger action indicates a timing at which the trigger action should be performed such that the user achieves the target action; and updating the action log based on acquired action.

\* \* \* \* \*